Nov. 27, 1928.
A. A. RIDDELL
1,693,253
MULTIPLE SPINDLE DRILLING MACHINE ARM
Filed June 28, 1927
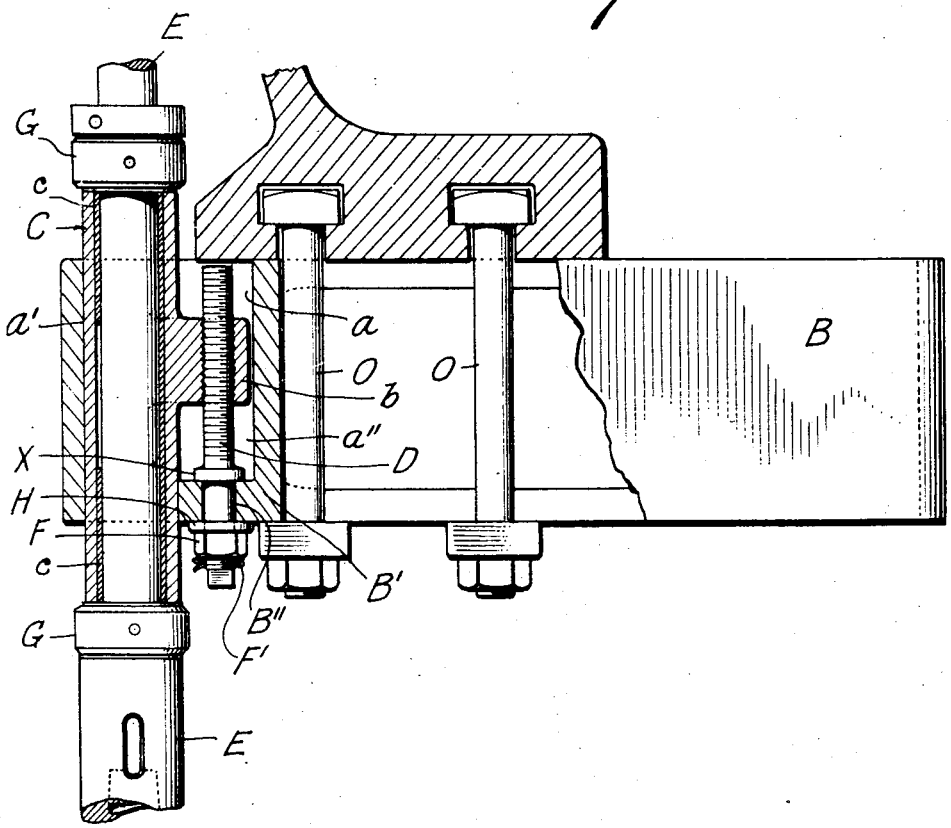

Patented Nov. 27, 1928.

1,693,253

UNITED STATES PATENT OFFICE.

AUSTIN A. RIDDELL, OF JACKSON, MICHIGAN, ASSIGNOR TO FOX MACHINE COMPANY, OF JACKSON, MICHIGAN, A CORPORATION OF MICHIGAN.

MULTIPLE-SPINDLE DRILLING-MACHINE ARM.

Application filed June 28, 1927. Serial No. 202,063.

This invention relates to improvements in the connection between the spindle bearing and the supporting arm of a multiple spindle drilling machine.

An object of the invention is to provide a compact, easily accessible mechanism for adjusting the relative position of the spindle bearing vertically with respect to the supporting arm.

A further object is the provision of means for making minute vertical adjustments.

The type of supporting mechanism herein described is adapted to allow the spindles carrying the drills to be quickly adjusted vertically and to be clamped securely in adjusted position.

Another object of the invention is to make the arm as light as possible consistent with adequate strength.

Other purposes of the invention will appear hereinafter.

The invention consists in the features, combination and arrangement of parts hereinafter described and particularly pointed out in the claims.

In the accompanying drawings:

Figure 1 is a vertical sectional view of a part of a drilling machine embodying the invention.

Fig. 2 is a plan view of Fig. 1.

In these drawings A represents the flange of the head casting of the multiple spindle drilling machine. To this head casting the spindle supporting arm B is secured by the clamping bolts O, which permit lateral adjustment of the arm in the head.

The supporting arm B at its outer end which projects beyond the flange A has a vertically disposed hole $a$ therethrough of irregular shape. The formation of this hole is shown in Fig. 2 in cross section as consisting of a circular aperture in communication with an aperture extending diametrically therefrom. The circular portion of the aperture extends the full depth of the arm to form a bore $a'$ and the other portion of the aperture forms a recess $a''$ which is open at the top, but is limited at the bottom by a wall B′ integral with the supporting arm, which wall has a vertical bore B″ therein. The bore $a'$ is adapted to receive and guide a sleeve C which has a horizontally extending lug or projection $b$, adapted to extend into the recess $a''$. The lug has a vertically disposed screw threaded bore in which works an adjusting screw D, this screw engaging the wall or flange B′ and passing through the bore B″, and being adapted to raise and lower the sleeve C. The screw D has a flange X on the upper side of the wall B′ and has the washer H on the lower side of the wall B′. This washer is supported by the hexagonal nut F which in turn is prevented from coming off from the screw by the spring cotter key F′ as shown. Thus when the screw D is rotated in one direction, the spindle bearing C is raised. When the screw D is turned in the opposite direction the spindle bearing C is lowered. When the spindle bearing is set in the desired position, the nut F is turned to the right and the washer H clamps the shoulder X of the screw D tightly against the casting B′ and thus locks the screw D against rotation and consequent loss of spindle adjustment. The screw D has a squared end whereby it may be turned by a wrench or the like.

The sleeve C receives and supports the drilling spindle E carrying the tool which operates upon the work, and when the sleeve C is moved vertically, the spindle E moves with it. The sleeve C has two bearings $c$ inserted therein which provide rotating bearing surfaces for the spindle E. Ball thrust bearings G are also provided between the spindle and sleeve at the ends of the sleeve for taking the pressure of the working tool.

The screw D is easily accessible at its lower end for operation.

The invention is not limited to the specific embodiment shown and described and changes may be made within the scope of the invention, for instance, any suitable means other than that shown, for preventing upward movement of the screw in its operation, may be provided within the scope of the invention.

In assembling the apparatus the clamping bolts O are loosened and the supporting arm is adjusted outwardly until the recess $a''$ is clear of the overhanging portion A′ of the flange A, then the spindle assembly including the sleeve C is assembled with screw D and placed in position downwardly through the hole $a$, the screw D passing through the bore B″.

I claim:

In combination in a multiple spindle drilling machine, an arm having means for connecting it to the head of the machine, said arm being connected with the head and having a vertically disposed cylindrical bore therethrough adjacent its outer end and a vertically disposed rectangular recess adjoining said cylindrical bore and communicating therewith at one side, said arm having a horizontally disposed flange which extends from the lower end thereof to a form a bottom for said rectangular recess, said flange being vertically bored to align and communicate with the said rectangular recess, a vertically disposed screw rotatably mounted in the bore in the flange and being disposed in said recess, said screw having an integral annular enlargement engaging the upper surface of said flange, a tool spindle supporting sleeve mounted in said cylindrical bore and having an integral horizontally disposed vertically bored lug extending laterally into said rectangular recess and adapted to receive said screw in screw-threaded engagement to adjust the sleeve to various positions relative to the arm, a nut below said flange for clamping the screw in adjusted position, said screw having a diametrical hole through its end and a cotter pin in said hole for retaining the nut in the screw.

In testimony whereof I affix my signature.

AUSTIN A. RIDDELL.